(12) United States Patent
Mylly et al.

(10) Patent No.: US 10,055,343 B2
(45) Date of Patent: Aug. 21, 2018

(54) MEMORY STORAGE WINDOWS IN A MEMORY SYSTEM

(71) Applicant: Memory Technologies LLC, Las Vegas, NV (US)

(72) Inventors: Kimmo J. Mylly, Ylojarvi (FI); Jani Hyvonen, Tampere (FI)

(73) Assignee: Memory Technologies LLC, Kirkland, WA (US)

( * ) Notice: Subject to any disclaimer, the term of this patent is extended or adjusted under 35 U.S.C. 154(b) by 0 days.

(21) Appl. No.: 15/383,765

(22) Filed: Dec. 19, 2016

(65) Prior Publication Data

US 2017/0185510 A1  Jun. 29, 2017

Related U.S. Application Data

(60) Provisional application No. 62/272,299, filed on Dec. 29, 2015.

(51) Int. Cl.
G06F 12/02 (2006.01)
(52) U.S. Cl.
CPC ...... G06F 12/023 (2013.01); *G06F 2212/657* (2013.01)
(58) Field of Classification Search
None
See application file for complete search history.

(56) References Cited

U.S. PATENT DOCUMENTS

| 4,648,035 | A | * | 3/1987 | Fava | G06F 12/0284 |
| | | | | | 711/202 |
| 6,253,300 | B1 | | 6/2001 | Lawrence et al. | |
| 6,260,101 | B1 | | 7/2001 | Hansen et al. | |
| 6,279,114 | B1 | | 8/2001 | Toombs et al. | |
| 6,314,504 | B1 | | 11/2001 | Dent | |
| 7,085,910 | B2 | * | 8/2006 | Delaney | G06F 12/0653 |
| | | | | | 711/202 |
| 7,257,669 | B2 | | 8/2007 | Ahvenainen et al. | |
| RE45,486 | E | | 4/2015 | Ahvenainen et al. | |

(Continued)

OTHER PUBLICATIONS

PCT Search Report and Written Opinion dated Apr. 4, 2017 for PCT Application No. PCT/US16/67772, 13 pages.

(Continued)

*Primary Examiner* — Kevin Verbrugge
(74) *Attorney, Agent, or Firm* — Lee & Hayes, PLLC

(57) ABSTRACT

A memory device comprises a first plurality of addressable memory locations associated with a first data storage window and a second plurality of addressable memory locations associated with a second data storage window. The memory device includes a controller that receives requests from a host device to identify the first data storage window and the second data storage window. The controller receives requests to assign a first window index value to the first data storage window and to assign a second window index value to the second data storage window. The controller receives memory commands from the host device that indicate the first window index value and at least one address. The controller accesses, based at least on the first window index value, a location associated with the at least one address within the first plurality of addressable memory locations.

20 Claims, 5 Drawing Sheets

(56) References Cited

U.S. PATENT DOCUMENTS

| | | | |
|---|---|---|---|
| 2003/0105914 A1* | 6/2003 | Dearth | G06F 12/1072 711/6 |
| 2003/0235408 A1 | 12/2003 | Silvester et al. | |
| 2004/0049600 A1* | 3/2004 | Boyd | G06F 12/145 709/250 |
| 2009/0198857 A1 | 8/2009 | Pyeon | |
| 2010/0131700 A1 | 5/2010 | Castillo | |
| 2012/0170395 A1 | 7/2012 | Pyeon | |
| 2013/0094271 A1 | 4/2013 | Schuetz | |

OTHER PUBLICATIONS

Affidavit of Christopher Butler from Internet Archives, Feb. 2017, Patent Trial and Appeal Board, *SanDisk v. Memory Technologies*, U.S. Pat. No. RE45,486, SanDisk Exhibit 1011, 8 pgs.

"Declaration of R. Jacob Baker, Ph.D., P.E. in Support of Petition for Inter Partes Review of U.S. Pat. No. RE45,486", SanDisk Exhibit 1009, Mar. 2017, 146 pages.

File History for U.S. Pat. No. 7,257,669, downloaded Mar. 2018 from USPTO Website, 2 pgs.

File History for U.S. Pat. No. RE45,486, downloaded Mar. 2018 from USPTO Website, 3 pgs.

McLean, Information Technology-AT Attachment with Packet Interface-6, Revision 3a, Dec. 2001, SanDisk Exhibit 1008, Patent Trial and Appeal Board, *SanDisk v. Memory Technologies*, U.S. Pat. No. RE45,486, 496 pgs.

PC Card Standard, vol. 2, Electrical Specification, Feb. 1999, SanDisk Exhibit 1007, Patent Trial and Appeal Board, *SanDisk v. Memory Technologies*, U.S. Pat. No. RE45,486, 273 pgs.

Tanenbaum, "Structured Computer Organization", 4th Edition, 1999, SanDisk Exhibit 1012, Patent Trial and Appeal Board, *SanDisk v. Memory Technologies*, U.S. Pat. No. RE45,486, 74 pgs.

"The MultiMediaCard", System Specification, Version 1.4, MMCA Technical Committee, SanDisk Exhibit 1010, Patent Trial and Appeal Board, *SanDisk v. Memory Technologies*, U.S. Pat. No. RE45,486, 106 pgs. 1998.

* cited by examiner

500

```
┌─────────────────────────────────────────────────────────────┐
│ SEND ONE OR MORE REQUESTS TO THE MEMORY DEVICE TO IDENTIFY  │
│ THE FIRST DATA STORAGE WINDOW AND TO IDENTIFY THE SECOND    │
│                     DATA STORAGE WINDOW                     │
│                              502                            │
└─────────────────────────────────────────────────────────────┘
                              │
                              ▼
┌─────────────────────────────────────────────────────────────┐
│ SEND ONE OR MORE REQUESTS TO THE MEMORY DEVICE TO ASSIGN A  │
│ FIRST WINDOW INDEX VALUE TO THE FIRST DATA STORAGE WINDOW   │
│  AND TO ASSIGN A SECOND WINDOW INDEX VALUE TO THE SECOND    │
│                     DATA STORAGE WINDOW                     │
│                              504                            │
└─────────────────────────────────────────────────────────────┘
                              │
                              ▼
┌─────────────────────────────────────────────────────────────┐
│  SEND ONE OR MORE MEMORY COMMANDS TO THE MEMORY DEVICE,     │
│ WHEREIN THE ONE OR MORE MEMORY COMMANDS INDICATE AT LEAST   │
│   THE FIRST WINDOW INDEX VALUE AND AT LEAST ONE ADDRESS     │
│                              506                            │
└─────────────────────────────────────────────────────────────┘
                              │
                              ▼
┌─────────────────────────────────────────────────────────────┐
│ RECEIVE, BASED AT LEAST ON THE ONE OR MORE MEMORY COMMANDS  │
│   INDICATING THE FIRST WINDOW INDEX VALUE, DATA STORED AT A │
│ LOCATION ASSOCIATED WITH THE AT LEAST ONE ADDRESS WITHIN THE│
│      FIRST PLURALITY OF ADDRESSABLE MEMORY LOCATIONS        │
│                              508                            │
└─────────────────────────────────────────────────────────────┘
```

FIG. 5

MEMORY STORAGE WINDOWS IN A MEMORY SYSTEM

CROSS REFERENCE TO RELATED APPLICATIONS

This patent application claims priority filing benefit from U.S. Provisional Patent Application No. 62/272,299, filed Dec. 29, 2015, which is hereby incorporated by reference, in its entirety.

BACKGROUND

Memory devices, such as Managed NAND storage modules, are used in association with a variety of devices including mobile phone devices (e.g., smartphones), servers (e.g., enterprise server farms, cloud-computing platforms), archival and backup systems, media player devices, environmental sensors, wearable devices, and Internet of Things (IoT) devices. Examples of memory devices include embedded MultiMediaCard (eMMC), Secure Digital (SD) cards, solid-state drive (SSD) modules, and so forth. A memory device stores data for use by a host device coupled to the memory device, including operating system code, applications and user data (e.g., photo data, video data, etc.).

Although memory devices have a wide range of storage capacities (e.g., 512 megabytes (MB), 256 gigabytes (GB), 1 terabyte (TB)), storage devices are still limited by a maximum storage capacity. For example, in the case of SD cards and eMMC devices, the maximum storage capacity is 2 terabytes. This is due to the 32-bit address argument in a command frame, which limits the memory device to $2^{32}$ unique memory addresses. Each address in SD cards and eMMC devices can address a 512 byte sector. By addressing 512 byte sectors using the $2^{32}$ unique memory addresses, the maximum capacity in these systems is 2 TB (512 bytes×$2^{32}$ unique memory addresses).

Previous attempts for increasing the addressable storage capacity of memory devices include changing the number of memory locations each address addresses. For example, some have proposed increasing the sector size from 512 bytes to 4096 bytes. This would enable the storage capacity to increase.

BRIEF DESCRIPTION OF THE DRAWINGS

FIG. 5 illustrates an example process for managing data associated with one or more data storage windows. The example process can be implemented by a host device.

The figures depict embodiments of the present invention for purposes of illustration only. One skilled in the art will readily recognize from the following discussion that alternative embodiments of the structures and methods illustrated herein can be employed without departing from the principles of the invention described herein.

DETAILED DESCRIPTION

The following description is presented to enable a person of ordinary skill in the art to make and use the various embodiments. Descriptions of specific devices, techniques, and applications are provided as examples. Various modifications to the examples described herein may be readily apparent to those of ordinary skill in the art, and the general principles defined herein may be applied to other examples without departing from the scope of the various embodiments. Thus, the various embodiments are not intended to be limited to the examples described herein, but are to be accorded the scope consistent with the claims.

Memory devices, such as managed NAND storage modules, are typical components in devices that store a wide variety of data. Examples of data that might be stored include operating system data, applications and user data (e.g., videos, photos, etc.). Additionally, the storage capacity needed to store user data, regardless of whether it is stored on the user's device or stored on a remote computer, is growing as users are storing content such as 4K videos, 3D movies, high-resolution surround sound audio tracks, and virtual-reality environments for immersive displays (e.g., head-mounted displays).

Moreover, as the movement towards the "Smart" appliances, connected-home technology, and the Internet of Thing grows, the number of devices that require high-capacity data storage will dramatically increase. In one example, it is desirable to have high-capacity memory devices to store around-the-clock high-definition surveillance video from multiple cameras installed around a user's home. In another example, consumers may require a high-capacity memory device inside their fitness/health tracker to store all of their health data (e.g., activity level, heart rate, blood pressure, location, body temperature, blood sugar) in high-resolution detail over the course of many years.

The present disclosure describes a memory device having a continuous memory address space that is addressed using at least one data storage window. The at least one data storage window enables addressing a continuously addressable address space that may exceed a memory limit defined by the number of address bits, such as the previous 2 TB limit, which was a result of the 32-bit address argument in SD and eMMC devices.

Figure 1:
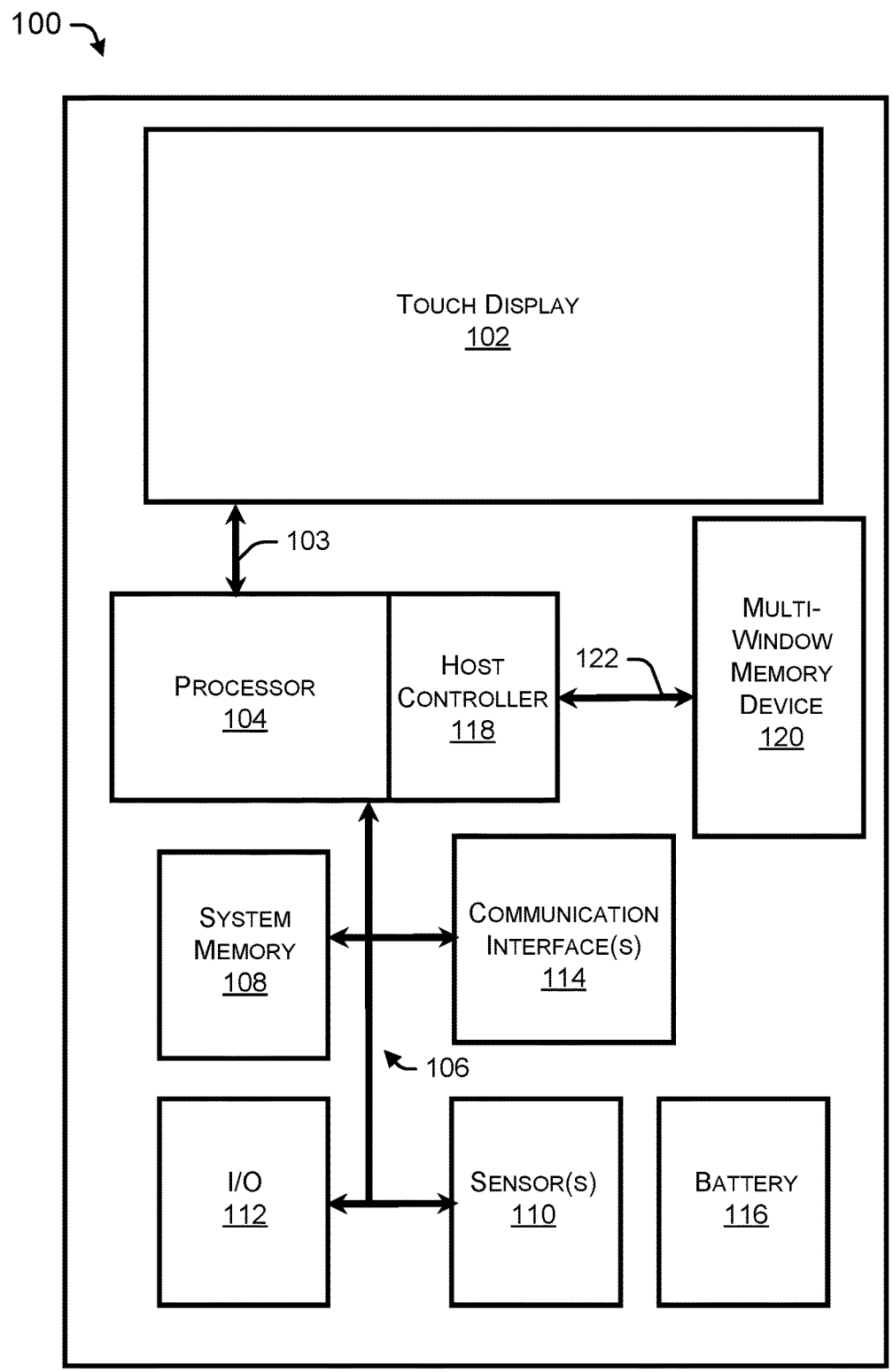
FIG. 1 illustrates an example environment in which a multi-window memory device may be used.

FIG. 1 depicts an example host device 100, such as a smartphone or a tablet, which may utilize embodiments of the present invention. Host device 100 includes a touch display 102 that is sensitive to a user's touch, such as for example based on capacitive or resistive detection. Bus 103 connects touch display 102 to processor 104, which may include a graphics subsystem that handles the display of graphics and text on touch display 102. Host device 100 also includes a number of other components connected to processor 104 through shared bus 106, including system memory 108 (e.g., dynamic random access memory or DRAM), sensors 110 (e.g., accelerometers, gyroscope, GPS, etc.), input/output (I/O) 112 (e.g., a speaker, a microphone, a keyboard, etc.), communications interfaces 114 (e.g., USB, Wi-Fi, Bluetooth, or other wired or wireless interfaces), and battery 116. In one embodiment, system memory 108 (e.g., DRAM) may be connected to processor 104 via a separate, dedicated bus. Processor 104 may also include a host controller 118 (which may be alternatively connected to, but separate from, processor 104) that interfaces with multi-window memory device 120 over bus 122. Alternatively, host controller 118 may interface with a multi-window memory device 120 over shared bus 106. The host controller 118 may be a digital circuit that manages the flow of data to and from the multi-window memory device 120 over bus 122. The host controller 118 may be placed or included in a stand-alone chip or integrated circuit die, or may be integrated into another chip or die of the host device 100. In some embodiments, the host controller 118 may be an integrated memory controller integrated into the processor 104. Both shared bus 106 and bus 122 may include several bus lines for data, commands, clocking signals, power, reset, etc. An example of the bus lines included in bus 122 is described below with respect to FIG. 2. Battery 116 provides power to the above described and other components of the host device 100 through a power supply bus and/or lines. While the use of multi-window memory device 120 is shown in the context of a touch-sensitive smartphone or tablet, the present invention is not limited to use in such devices. Embodiments of the present invention may be applied to any electronic device that requires storage, e.g., wearable computers such as smartwatches or augmented-reality glasses, televisions, cameras, servers, unmanned aerial vehicles, gaming consoles, personal computers, remote sensors, set-top boxes, network-connected home appliances and the like. Additionally, the architecture of host device 100 is provided for illustrative purposes only and should not be considered limiting.

Figure 2:
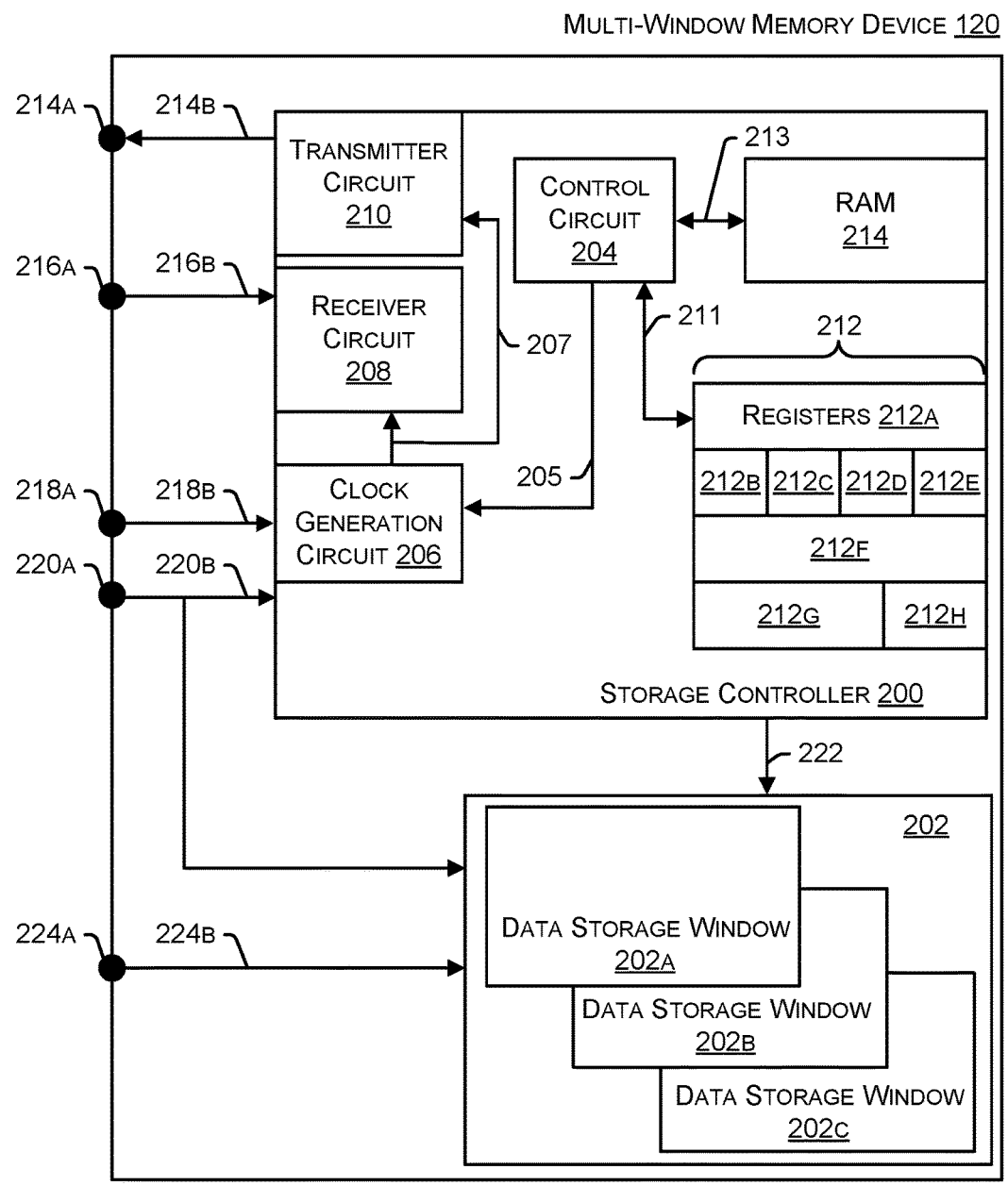
FIG. 2 illustrates additional details of a multi-window memory device.

FIG. 2 depicts an exemplary architecture for a multi-window memory device that may implement embodiments of the present invention. Multi-window memory device 120 may be a memory or storage device contained within a package (e.g., a ball grid array, or BGA package, designed to be mounted on a printed circuit board) or contained within a multichip package (MCP). In addition, multiple packages or MCPs may come together to form a multi-window memory device 120. As an example, multi-window memory device 120 may be an embedded MultiMediaCard (eMMC) module or Secure Digital (SD) card. Alternatively, multi-window memory device 120 may be a memory or storage device contained within a removable card that fits within a slot on the host device (e.g., Secure Digital card) or a semi-removable device such as an SSD module or PC/server cards/modules (e.g., PCIe cards). Additionally, although multi-window memory device 120 is shown as being one self-contained device, multi-window memory device 120 may also be implemented with a collection of interconnected devices.

As shown in FIG. 2, multi-window memory device 120 includes a storage controller 200 for communicating data between mass storage 202 and host device 100 (see FIG. 1). Storage controller 200 includes control circuit 204 for controlling the operation of storage controller 200. Control circuit 204 may be connected to random access memory (RAM) 214 over bus 213 for storing operating information and/or temporary storage as required by multi-window memory device 120. Storage controller 200 also includes clock generation circuit 206 for generating an internal clocking signal on internal clock bus 207, receiver circuit 208 for receiving data and commands from host controller 118 (see FIG. 1), transmitter circuit 210 for transmitting data and status information to host controller 118 (see FIG. 1), and memory cell(s) (e.g., registers 212) for storing information and settings relating to the operation of multi-window memory device 120, including information related data storage windows. Control circuit 204 may use bus 211 to read information from, or write information to, registers 212. Multi-window memory device 120 communicates with host controller 118 through data out line 214*b* and data terminal 214*a*, which may provide data and status information, and data in line 216*b* and data terminal 216*a*, which may provide data, commands, and status information.

Multi-window memory device 120 also includes a clock line 218*b* and a clock terminal 218*a* that provide, e.g., a reference clock signal to clock generation circuit 206 or clock for the transmitter/receiver IO block. Bus 222 allows for storage controller 200 to read data from, and write data to, the memory locations associated with data storage windows 202*a*-202*c*. Power terminal 220*a* and power line 220*b* provide power to storage controller 200. For example, in the eMMC specification (e.g., JEDEC Standard No. 84-B51), VccQ is defined as the supply voltage for the storage controller 200. While the above lines and terminals are shown to be single lines and terminals in FIG. 2, each line and terminal may be made up of multiple lines and terminals. For example, power terminal 220*a* may include multiple terminals associated with multiple lines of power line 220*b* that individually provide power to the different components (e.g., mass storage 202 and storage controller 200). In one example, in the eMMC specification, Vcc is defined as the supply voltage for the NAND flash device. Thus a power terminal 224*a* and power line 224*b* may provide power to mass storage 202. As another example, data out line 214*b* and data out terminal 214*a* or data in line 216*b* and data in terminal 216*a* may be implemented using two lines (e.g., a differential pair or a 2-bit wide bus) connected to two terminals. Alternatively, the data out line 214*b* and data out terminal 214*a* and data in line 216*b* and data in terminal 216*a* may be implemented by using a single bi-directional line or multiple bi-directional lines.

Mass storage 202 may include one or more memory blocks on one or more memory planes/banks on one or more chips having memory circuits or cells for storing one or more bits of information. For example, mass storage 202 may be implemented with a non-volatile memory such as NAND flash memory having memory cells/circuits (e.g., NAND cells) each capable of storing one bit (single-level cell) or multiple bits (multi-level cell) of data. Other forms of non-volatile memory can also be used without departing from the present invention. For example, non-volatile memory may include phase change memory (PCM), magneto-resistive random-access memory (MRAM), resistive random-access memory (RRAM), ferroelectric random-access memory (FRAM), and so forth.

In various implementations, mass storage 202 includes a plurality of addressable memory locations that are each associated with at least one memory cell, a byte, a word or multiple words, a sector, at least one memory plane/blank, at least one memory block, or at least one memory page. One or more addressable memory locations may also comprise, or in some way be associated with, a region or portion of memory, as discussed herein. An address may be a logical address or a physical address.

Mass storage 202 may be physically divided, logically divided, and/or divided into data storage windows 202*a*-202*c*. For example, mass storage 202 may be implemented as a single chip. Alternatively, mass storage 202 may be implemented with several discrete chips that are connected together in a single package (as shown in FIG. 2) or, alternatively, separately packaged and externally connected together. Mass storage 202 may also be divided up into planes/banks, which are then further divided into blocks, which are then further divided into pages. Storage controller 200 is connected to mass storage 202 through bus 222, which allows for storage controller 200 to read data from, and write data to, mass storage 202. In at least one implementation, the mass storage 202 may include one or more internal memory controllers coupled to a plurality of addressable memory locations (e.g., within a NAND package). Thus, the storage controller 200 may operably be coupled to the addressable memory locations, either directly or indirectly, through the one or more internal memory controllers.

RAM 214 is a memory that storage controller 200 uses to store operating information (e.g., operating code and/or state information) that may need to be readily/quickly accessed. For example, RAM 214 may store a translation table that describes how logical addresses are mapped to physical addresses of mass storage 202. When RAM 214 is not implemented or not enough RAM 214 is implemented within multi-window memory device 120, in some cases, storage controller 200 may instead request and use a portion of system memory 108 of host device 100.

Clock generation circuit 206 may be implemented with a circuit that is capable of generating a clock signal. For example, clock generation circuit 206 may be implemented using common clock recovery and/or generation circuits including phase-locked loops (PLLs), oscillators, voltage controlled oscillators, delay locked loops, frequency detectors, frequency multipliers/dividers, phase detectors, combinations of these circuits, or any other suitable circuit. Clock generation circuit 206 may also rely on other components, such as resistors, capacitors, inductors, crystals, or MEMS devices. Clock generation circuit 206 may also be programmable so that it can provide a clocking signal output that varies according to the inputs that it receives. For example, clock generation circuit 206 may be configured to produce a clocking signal of a very high quality (e.g., low jitter) when a reference clock signal is present on reference clock line 218b. Clock generation circuit 206 may also be configured to produce a clocking signal of a lower quality when a reference clock signal is absent. As other examples, the frequency, duty cycle, jitter, output skew, or propagation delay of the outputted clocking signal may be set according to inputs (e.g., control bits) that are provided to clock generation circuit 206 through bus 205. In alternative architectures, clock generation circuit 206 may have direct access to registers 212 without going through control circuit 204 or clock generation circuit 206 could have a register internal to itself for storing clock configuration information. While clock generation circuit 206 is shown to be part of storage controller 200, clock generation circuit 206 may also be implemented external to storage controller 200 without departing from the present invention.

Receiver circuit 208 and transmitter circuit 210 may be configured to receive the internal clock signal directly on clock line 218b or on internal clock line 207 so that multi-window memory device 120 may transfer data to host device 100 at higher rates when operating without a reference clock signal. In another embodiment, internal clock line 207 only provides the internal clock signal to the receiver circuit 208, but not to the transmitter circuit 210. In yet another embodiment, internal clock line 207 only provides the internal clock signal to the transmitter circuit 210, but not to the receiver circuit 208.

Individual memory cells (e.g., registers 212) may be configured to store one or more bits of information regarding the operation of multi-window memory device 120. For instance, registers 212 may be implemented as part of storage controller 200, as part of mass storage 202, as part of RAM 214, or as part of some other memory circuit in multi-window memory device 120. The memory used for registers 212 may be any type. For example, registers 212 may be implemented in volatile (e.g., SRAM, DRAM), non-volatile (flash, magnetic, resistive), read only memory (ROM), one-time programmable, or any combination of different types of memory.

Registers 212 may include several individual registers, e.g., registers 212a-212h of similar or different sizes. For example, register 212a may be a 1-byte register while registers 212b-212e are 1-bit registers and register 212f is a 4-byte register. Registers 212 can be used to store several specific types of information. In one case, some of registers 212 store read-only information that describes how multi-window memory device 120 operates (e.g., supported features) or requirements for multi-window memory device 120 to properly operate or operate at different levels of performance (e.g., current requirements for different transfer rates). In another case, some of registers 212 store writeable information that configures how multi-window memory device 120 operates or what multi-window memory device 120 needs to operate. In yet another case, some of registers 212 store information about how multi-window memory device 120 is currently operating or the current state of multi-window memory device 120. For example, SD and eMMC devices feature a Card Identification (CID) register for storing a unique card identifier associated with the SD or eMMC device. In another example, SD and eMMC devices feature a Relative Card Address (RCA) register for storing the local system address associated with the SD or eMMC device. Together, registers 212 may also store all of the different types of information described above along with other types of data.

In several embodiments, registers 212 may store various settings related to the number of data storage windows available to the multi-window memory device. As used herein, the term "data storage window" is intended to represent a portion of mass storage. Also, in some embodiments, a mass memory is divided into multiple data storage windows such that a first data storage window and a second data storage window is part of a combined memory portion that is addressable within a continuous memory address space. A continuous memory address space includes a memory address space in which all addresses from a beginning address of the memory address space to a last address of the memory address space are included in the memory address space. A continuous memory address space includes a finite number of discrete addresses, with no two of the discrete addresses being numerically separated by an address that falls outside of the continuous memory address space. In some embodiments, a mass memory is divided into two or more data storage windows in which a last address of a last memory location of the first data storage window is numerically adjacent (either in ascending or descending order) to a beginning address of a beginning memory location of the second data storage window. In some embodiments, a mass memory is divided into two or more non-overlapping data storage windows in which a first data storage window and a second data storage window include no addresses in common. A data storage window includes one or more memory blocks on one or more memory planes/banks on one or more chips having memory circuits or cells for storing one or more bits of information. For example, a data storage window may be implemented on a non-volatile memory such as NAND flash memory having memory cells/circuits (e.g., NAND cells) each capable of storing one bit (single-level cell) or multiple bits (multi-level cell) of data. Other forms of non-volatile memory can also be used without departing from the present invention. For example, non-volatile memory may include phase change memory (PCM), magneto-resistive random-access memory (MRAM), resistive random-access memory (RRAM), ferroelectric random-access memory (FRAM), and so forth.

In some embodiments, the multi-window memory device may have two or more data storage windows. In such cases, there may be an index parameter (or index argument or index value) that indicates the one or more active data storage window. As an example, the index parameter may represent each data storage window along with its data storage offset address as follows:

Index 0x0 refers to a first data storage window starting at 512 B sector address 0x0000 0000.

Index 0x1 refers to a second data storage window starting at 512 B sector address 0x1 0000 0000.

Index 0x2 refers to a third data storage window starting at 512 B sector address 0x10 0000 0000.

After a particular data storage window is selected, a 32-bit sector address may be used to access the data within the selected data storage window. As an example, if the second data storage window is selected (index 0x1), then address 0x0000 0000 points to address 0x1 0000 0000 due to the offsets defined above.

In some cases, only one data storage window may be active at a given time. For example, if the second data storage window (index 0x1) is the currently active window, then memory accesses are limited to the addressable memory locations associated with the second data storage window (e.g., 1 0000 0000-1 FFFF FFFF). If the host device or memory controller wants to begin a memory access to a memory location outside the addressable memory locations associated with the second data storage window, the index parameter needs to be switched to the appropriate index. For example, it may not be possible to access the address 0x1 0000 0000 (in the second data storage window) with one memory access command and then access the address 0x10 0000 0000 (in the third data storage window) in a subsequent memory access command without the host first issuing a command (e.g., CMD7) or request to select the third data storage window. However, because the address space is continuous from one data storage window to the next, it is possible to initiate a multiple block access in a first active data storage window and have the memory access continue past the window boundary associated with the first active data storage window and continue on to the next data storage window, which may not have been activated or selected to be the current data storage window. Stated another way, a memory access that begins in a selected (or activated) data storage window and crosses into a second data storage window may not need the second data storage window to be explicitly activated (e.g. by CMD7) for the access to continue. For example, if the first data storage window is activated, it is possible to initiate a two-block sequential read access to address 0xFFFF FFFF and read from address 0xFFFF FFFF (0x0 FFFF FFFF) of the first data storage window. The second block of the two-block read access may continue on at the second data storage window, which is currently not selected or activated, at address 0x0000 0000 (0x1 0000 0000).

In another embodiment, a host device may issue a command or request to select two or more data storage windows (e.g. a primary and a secondary data storage window). This may be accomplished by defining a set of bits within a command frame for selecting the multiple data storage windows. For example, using CMD7 from the eMMC and SD specification, this may be achieved by allocating argument bits [31:16] for selecting a first (e.g. primary or currently active) data storage window and argument bits [15:0] for selecting a second (e.g. secondary or next-to-be-activated) data storage window. In this way, the second data storage window may be informed about a forthcoming access command (e.g. read or write) or data transfer that starts in the first data storage window, but will extend to the second data storage window. In some instances, the two or more data storage windows specified in the command may be located on different multi-window memory devices.

In some embodiments, the multi-window memory device may have only one data storage window. In this case, the start address of the data storage window may be indicated by an "offset" argument. The data storage window may present a continuously addressable memory space by dynamically shifting 2 TB data storage window relative to the offset address.

Each data storage window may or may not be related to a memory partition (e.g., physical partition, primary partition, extended partition, logical partition). In other words, each data storage window may have multiple partitions contained within itself or a single partition may be composed of multiple data storage windows. Furthermore, the data storage windows within the one or more multi-window memory device may have the same data storage capacities or different storage capacities.

Figure 3:
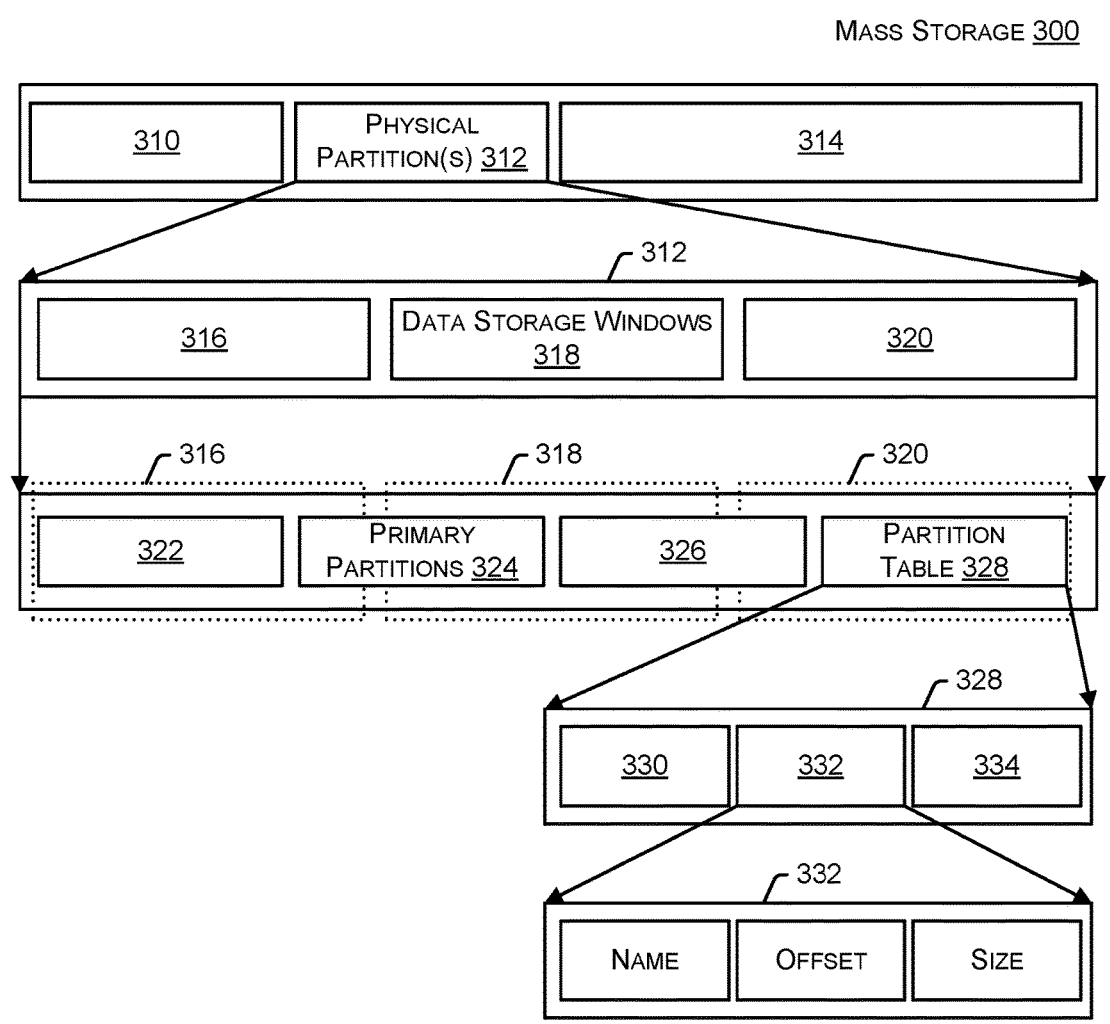
FIG. 3 illustrates an example of how a multi-window memory device may be configured.

FIG. 3 illustrates an example multi-window memory device configuration. The mass storage 300 of the multi-window memory device may be divided into three physical partitions 310, 312, 314. Each physical partition may have different memory capacity than another physical partition. A physical partition 312 may be divided into several data storage windows 316, 318, 320. Data storage windows 316, 318, 320 may be further composed of primary partitions 322, 324, 326, along with a partition table 328.

A partition table 328 may be included in each of the data storage windows and may include the attributes, names, sizes, offset, and other parameters regarding the various partitions in the multi-window memory device. In this example, partition table 328 contains three partition table entries 330, 332, 334. In this example, partition table entries 330, 332, and 334 include information describing the name, offset, and size for primary partitions 322, 324, and 326, respectively. Furthermore, each data storage window may also contain a partition table backup. In the event that partition table 328 is corrupted or deleted, the partition table backup may be used by the memory controller or the host controller to recover it.

A primary partition may be within, or associated with, multiple data storage windows. In other words, one or more primary partitions need not be within, or associated with, a single data storage window. Instead, a primary partition, partition backup table, or partition table may span across two or more data storage windows. For example, primary partition 324 is associated with data storage windows 316 and 318. In this case, the partition table 328 may include information to indicate that this primary partition spans more than one data storage window. A memory controller or host device may be configured to access this information and to determine based at least in part on this information that the primary partition spans more than one data storage window.

In a further example, multiple data storage windows may be spread across multiple physical partitions. For example, physical partition A may contain data storage windows 1 and 2. Physical partition B may contain data storage windows 3, 4, and 5. This is in contrast to the embodiments where all the data storage windows are within a single physical partition. There may be an indication associated with a data storage window that indicates the relative position of the data storage window (e.g., the $1^{st}$ data storage window or the $5^{th}$ data storage window) in the group of data storage windows related to the physical partition. For example, the index values may be allocated as follows: for physical partition A, data storage windows 1 and 2 are assigned indexes 0x01 and 0x02, respectively. For physical partition B, data storage windows 10, 11, and 12 are assigned indexes 0xA, 0xB and 0xC, respectively. As there is no index 0x3 allocated (or 0x9), this may mean that storage window 0x2 represents the last data storage window associated with physical partition A.

Information indicating the relationships between different physical partitions and their associated data storage windows may be stored by the host or the multi-window memory device. In at least one embodiment, when a request is made for a specific data storage window, the multi-window memory device may be configured, based at least on the information indicating these relationships, to change physical partitions when switching from a first data storage window to a second data storage window (e.g., a first data storage window is linked to first physical partition, while a second data storage window is linked to a second physical partition). This may be advantageous because it simplifies communications by not requiring a separate command for changing physical partitions. Instead, the changing of physical partitions is linked or coupled to a request for switching between data storage windows. Alternatively, a data storage window may be associated to a physical resource (e.g., a specific memory chip in a specific memory channel) of the multi-window memory device.

In one example, a multi-window memory device has a storage capacity of 10 TB and five data storage windows are associated with the 10 TB multi-window memory device. In this example, each data storage window has a data storage capacity of 2 TB. In one or more embodiments, during initialization of the multi-window memory device, the memory device controller receives a request (e.g., a command, a message, an opcode) from the host device to identify each of the data storage windows. During the identification process, the memory controller may query or read out a unique identifier for each of data storage windows. In some cases, the unique identifier may have been assigned to each data storage window during the manufacturing process. In other cases, the data storage windows do not have a unique identifier pre-assigned. Instead, the memory controller may assign a unique identifier to each data storage window. The memory controller may send information regarding the data storage windows, such as the unique identifier, back to the host device. In some embodiments, the host may be interfacing with multiple multi-window memory devices (e.g. where each multi-window memory device is connected to a common physical interface). Each of the multi-window memory devices may or may not have unique identifiers associated with each of their data storage windows.

In various implementations, after the identification of the data storage windows, the memory controller assigns a window index value to each of the data storage windows. The window index value may or may not be the same as the unique identifier associated with each of the data storage windows.

The window index values and/or the unique identifier associated with each of the data storage windows may be stored in registers, data areas, partitions (e.g., boot partition) partition tables or other dedicated memory spaces on either the host device or the multi-window memory device. In addition, the registers, partition tables, or dedicated memory spaces may also store the relationships between the unique identifiers, window index values, partitions, and mass storages. For example, a register within the multi-window memory device may store information for indicating that primary partition 326 is part of data storage window 318, which is part of physical partition 312. Moreover, the registers, partition tables, or dedicated memory spaces may also store information related to the size, location, and attributes of the data storage windows, partitions, and mass storages.

In various embodiments, the assignment of window index values may be initiated by a request from the host device. The assignment of window index values may also be initiated by the memory controller itself without any input from the host device. Once the window index values have been determined or assigned, these values may or may not be passed on to the host device. In other embodiments, there may be a single data storage window where the start address may be periodically reset by the host or memory controller. For example, the host may issue a command with a specific argument that specifies the new start address for the data storage window. In another example, the new start address for the data storage window may be reset by changing a register parameter. The starting address of the data storage window may need to be reset every time a new access is made to an address outside of the current window's address space.

In some embodiments where the assignment of window index values is initiated by a request from the host device, the process may use existing commands from the eMMC or SD specification. For example, SEND_OP_COND (CMD1), ALL_SEND_CID (CMD2), and SET_RELATIVE_ADDR (CMD3) from the eMMC specification may be used for identifying multiple data storage windows.

In embodiments where existing commands from the eMMC specification are used, the host begins by requesting that the cards send their valid operation conditions (CMD1). The response to CMD1 may include the 'wired and' operation on the condition restrictions of all data storage windows or multiple multi-window memory devices in the system. Any incompatible data storage windows or multi-window memory devices are sent into an inactive state. The host then issues the broadcast command, ALL_SEND_CID (CMD2), asking all multi-window memory devices or data storage windows for its unique identifier. Here, the unique identifier associated with each multi-window memory device or data storage window may be stored as though it were the unique card identification (CID) number from the eMMC specification. All unidentified multi-window memory devices or data storage windows (e.g., those which are in ready state) may simultaneously start sending their unique identifiers serially, while bit-wise monitoring their outgoing bitstreams. Those multi-window memory devices or data storage windows, whose outgoing unique identifier bits do not match the corresponding bits on the command line in any one of the bit periods, stop sending their unique identifiers and wait for the next identification cycle (remaining in the ready state), starting with CMD2, received from the host. Since unique identifiers are unique for each multi-window memory device or data storage window, there should be only one multi-window memory device or data storage window that successfully sends its full unique identifier to the host.

Thereafter, the host may issue SET_RELATIVE_ADDR (CMD3) to assign to each data storage window with a window index value. Here, the window index value associated with each data storage window may be stored as though it were a relative card address (RCA) from the eMMC specification. The window index value, which may be shorter than the unique identifier, can be used to address the data storage window in the future data transfer mode. In some embodiments the host assigns the window index value. In other embodiments, the host requests the multi-window memory device to respond with a window index value assigned by the multi-window memory device for each data storage window. In at least one embodiment, the window index values are assigned in a consecutive manner (e.g., "0001", "0002", "0003", etc.).

The host may repeat the identification and assignment process by cycling through the CMD2 and CMD3 commands. The iterative cycling of CMD2 and CMD3 will continue so long as the host receives a unique identifier from an unidentified multi-window memory device or data storage window in response to the identification command (CMD2). If no more multi-window memory devices or data storage windows respond to this command, all data storage windows and multi-window memory devices have been identified. The time-out condition to recognize completion of the identification and assignment process may include the absence of a start bit for more than a threshold number of clock cycles after sending CMD2. Alternatively, the multi-window memory device may have internal logic that determines when the assignment a window index values is complete and may send an indication back to the host device that the assignment process is done. Furthermore, this identification and assignment process may be triggered automatically upon detecting a multi-window memory device being operatively coupled to the host device.

In one example embodiment, a multi-window memory device has four data storage windows. A host device sends CMD2 and the multi-window memory device responds with a single CID. The host then sends the multi-window memory device a CMD3 command to assign one of the four data storage windows with a window index value. During the next cycle, the host sends a second CMD2 command and the multi-window memory device responds with the same CID. The host detects that the same CID is being sent again and interprets this repeated CID to mean that the multi-window memory device has another data storage window that has yet to be assigned a window index value. Next, the host sends the multi-window memory device another CMD3 command to assign the second of the four data storage windows with a window index value different from the value given to the previous data storage window. This pattern may be repeated until the multi-window memory device stops sending the CID in response to a CMD2 command or when the multi-window memory device detects that all of its data storage windows have been assigned a window index value.

In another example embodiment, a multi-window memory device has six data storage windows. A host device sends a CMD2 command and the multi-window memory device responds with a first CID associated with a first data storage window. The host then sends the multi-window memory device a CMD3 command to assign the first data storage window with a window index value. During the next cycle, the host sends another CMD2 command and the multi-window memory device responds with a second CID associated with a second data storage window. Next, the host sends the multi-window memory device another CMD3 command to assign the second of the six data storage windows with a window index value different from the value given to the previous data storage window. This pattern may be repeated until multi-window memory device stops sending any CIDs in response to a CMD2 command or when the multi-window memory device detects that all of its data storage windows have been assigned a window index value.

In some embodiments, the number of data storage windows and/or the data storage capacity for each data storage window is not pre-determined, but rather is determined by the host device. In one example, the memory device receives one or more requests from the host device that specifies that the memory device should configure itself with multiple data storage windows, along with the size of each of the data storage windows (e.g., a request for five data storage windows, with three 2 TB windows and two 4 TB windows). Regardless of the number of data storage windows and the size of the storage windows, all the data storage windows may form a continuous memory address space with another data storage window. Moreover, the data storage windows may form a continuous memory address space with other data storage windows that are located within the same multi-window memory device or with other data storage windows located in another multi-window memory device.

In some embodiments, the multi-window memory device forms a continuous memory address space using the 32-bit multi-window memory device that may be accessed by a 64-bit host. In these embodiments, the memory device or host device may have a look-up table, algorithm, index, or other conversion tool to transform a 64-bit address into a 32-bit address with a window index value. By using a window index value, the multi-window memory device can understand specifically which data storage window is relevant to the current memory access and then process the 32-bit address access for specified data storage window. Types of memory accesses may include, for example, a read access, write access and erase access.

In one example, a 64-bit read command may be issued by the host device. A traditional eMMC or SD memory device may be unable to process this read command due to the memory device's 32-bit command frame address argument. However, by implementing multiple data storage windows, the host device may convert the 64-bit read command into a two-part address, the first part indicating a specific data storage window and the second part addressing a specific memory location within the specific data storage window using a 32-bit memory address. In some embodiments, it may be the memory device that converts an incompatible bit address from a host into a two-part address that is compatible with the memory device. By using a combination of a window index value to reference a specific data storage window and a 32-bit addressing mode, a 32-bit memory device can achieve a storage capacity far greater than the traditional 2 GB limit while maintaining a continuously addressable memory space across the entire storage area.

In another embodiment, the multi-window memory device may use other existing commands from the eMMC and SD specification, such as the SELECT/DESELECT_CARD (CMD7) command, for selecting the desired data storage window. In the eMMC and SD specification, the SELECT/DESELECT_CARD (CMD7) command received from the host toggles a card between the stand-by and transfer states or between the programming and disconnect states. In both cases, the host may select a card by card's relative address and deselect the card by an address of any other card. In the current embodiment, CMD7 may be used to toggle between different data storage windows within the same multi-window memory device. In other embodiments, one or more CMD7s may be used to switch to a different multi-window memory device and to change data storage windows. In some embodiments, a single CMD7 may be used to switch data storage windows, but internal logic contained within either the host or the multi-window memory device recognizes that the change in data storage windows also requires a change to a different multi-window memory device.

In one example, a memory access command may be issued by the host device to the multi-window memory device. However, in order to take advantage of the entire memory space offered by the multi-window memory device, the memory access command may be preceded by a command to activate or select one or more data storage windows. For example, CMD7 from the eMMC and SD standard may be used to select a specific data storage window by referencing the window index parameter (or index value). CMD7 allows a host device to access multiple data storage windows while preserving 32-bit memory addressing for each data storage window.

A multi-window memory device having continuously addressable memory locations is useful in the example an open-ended multiple block write (e.g., CMD25 in the eMMC and SD specifications). Here, the host device begins by indicating an open-ended multiple block write and then proceeds to begin writing data to a particular data storage window. In the case of a multi-window memory device, the data may be continuously written to the memory even if the data being written crosses over to the next data storage window. Because of the continuous memory address space, the multi-window memory device does not need to be limited by the 32-bit architecture, nor does it need to be limited by the address space allocated to each data storage window. Instead, the multi-window memory device is able to write data continuously and is limited only by the number of data storage windows available. Similarly, a pre-defined multiple block write (e.g., CMD23 and CMD25 in the eMMC and SD specifications) may also take advantage of the continuous memory address space and span its write access across two or more data storage windows.

In some embodiments the multi-window memory device may send a "busy" signal to the host device. For example, this busy signal may indicate that the multi-window memory device is in the process of programming and is unable to handle additional commands or requests from the host. In another example, the busy signal may indicate that a specific data storage window within the multi-window memory device is busy. In cases where the memory access (e.g., a pre-defined multiple block write) crosses two or more data storage windows, the busy signal may be implemented to mean that all data storage windows involved in the access are busy or only a subset of the data storage windows are busy (e.g., the busy signal is interpreted to mean that only the first and last data storage windows are busy). The multi-window memory device may indicate the busy state by pulling down a data channel line (e.g., DAT0 line). The multi-window memory device may also send a first message to the host device to indicate the busy state, followed by a second message to indicate a ready state (e.g., no longer busy). In one example, a host device may be able to make memory accesses to data storage window that is ready while another data storage window on the same multi-window memory device is in a busy state (e.g., programming state).

In at least one embodiment, the multi-window memory device may designate one of multiple data storage windows to be backwards compatible with legacy host devices that do not support window indexing or one or more data storage windows. For example, a multi-window memory device may be in the form of a removable card with a capacity of 10 TB. This removable card may contain five data storage windows of 2 TB each. However, one of the five data storage windows may be reserved to support legacy host devices. In this way, the multi-window memory card may take advantage of its full 10 TB storage capacity with host devices supporting multiple data storage windows, but also support at least some storage capabilities (e.g., up to 2 TB) for legacy hosts. The multi-window memory device may include a flag, descriptor, or other indicator stored in one or more registers to signal that the memory device is configured in a manner that supports legacy host devices.

When a multi-window memory device designates a data storage window to be backwards compatible with legacy hosts, the memory controller in the multi-window memory device may need to temporarily mask or change certain metadata portions (e.g., partition tables) to allow a legacy host to only recognize and access the designated data storage window without corrupting data related to the other data storage windows. Temporarily masking or changing the metadata portions may result in the legacy host having only the capability to read data out from the data storage window. In other embodiments, the legacy host is allowed to perform all memory access types (e.g., read, write, erase) when interfacing with multi-window memory device.

When initializing a multi-window storage device, the device may include a flag, descriptor, or other indicator stored in one or more registers to indicate that the device should initialize in a mode that supports legacy host devices or a mode that does not support legacy host devices. The flag, descriptor, or other indicator may be preset by the memory device manufacturer or configurable by the host device. Similarly, the host may also be configured to indicate to the memory device that it supports multi-window memory devices. For example, this indication may be in the form of a command sent by the host to the memory device. For example, a command may be issued by a legacy host that contains an argument (e.g., all zeros in the arguments field) that by default indicates it does not support multi-window memory devices. An advantage of supporting legacy host devices may mean the multi-window memory device is compatible with a wider range of host devices. Stated another way, a multi-window memory device that does not support legacy devices may not be able to initialize or operate when coupled to a legacy host.

In some embodiments, one or more storage windows may be hidden or inaccessible. In one example, at least one data storage window is configured to be hidden from the host device unless the host authenticates itself to have access to the hidden data storage window. For example, the hidden data storage window may be a secure portion of the mass storage that stores sensitive information (e.g., replay protected memory block, write protected block, portion storing identification information of the operating systems, etc.). If the host device is unable to authenticate itself to the memory device, the host device may not be able to recognize or be able to access the address spaces associated with the one or more hidden data storage windows. In another example, if a multi-window memory device is coupled to a host device that is unable to authenticate itself, the host may only see four out of the five data storage windows. The unauthorized host cannot read, write, or erase the fifth data storage window containing sensitive data (e.g., boot data). If this same multi-window memory device is coupled to a host that is able to authenticate itself, then this host may detect all five data storage windows and be able to write, read, or erase the data on the previously hidden/inaccessible data storage window.

Figure 4:
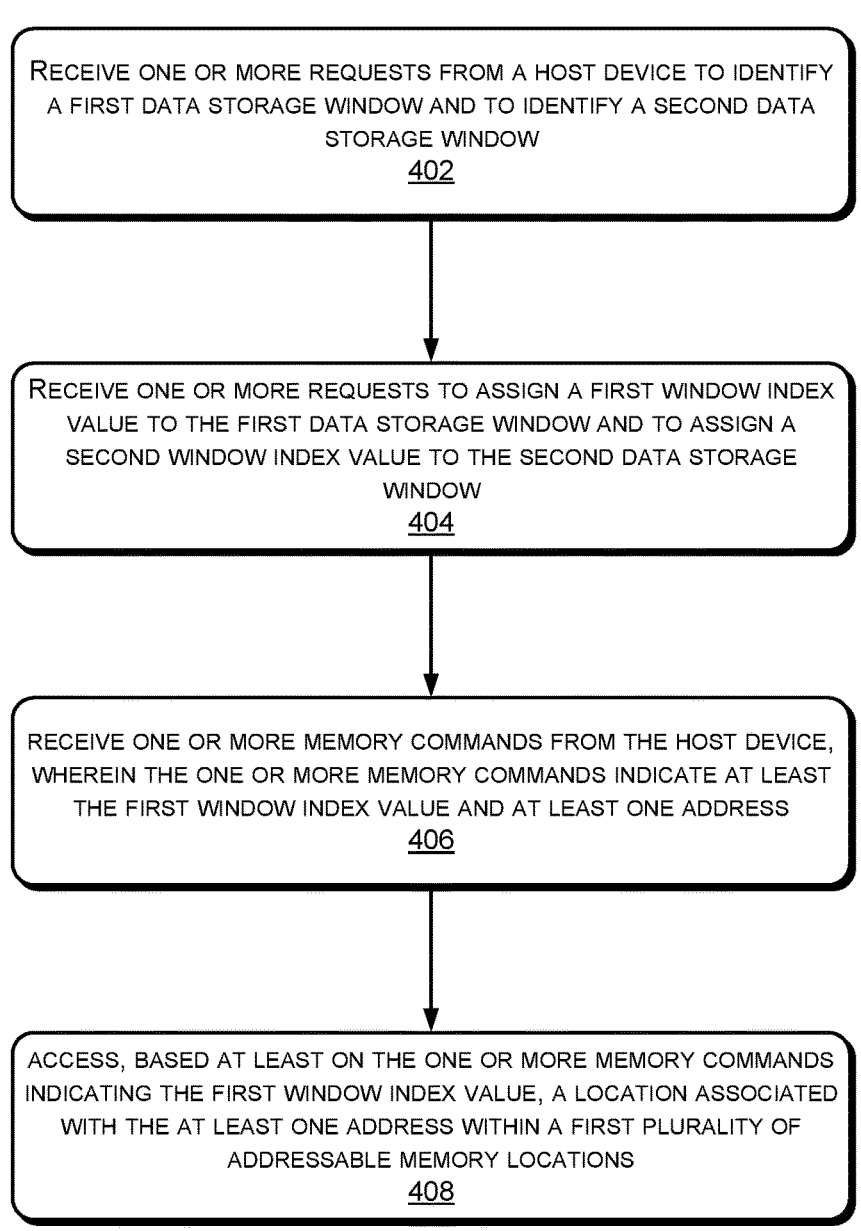
FIG. 4 illustrates an example process for managing data associated with one or more data storage windows. The example process can be implemented by a memory device.

FIG. 4 illustrates an example process for managing data associated with one or more data storage windows. The example process can be implemented by a memory device (e.g., multi-window memory device 120 of FIGS. 1 and 3, or mass storage 300 of FIG. 3).

At 402, the memory device can receive one or more requests from a host device to identify a first data storage window and to identify a second data storage window. In some instances, the operation can include receiving one or more requests from a host device to identify a first data storage window and to identify a second data storage window, the first data storage window associated with a first plurality of addressable memory locations of the memory device, each of the first plurality of addressable memory locations having at least one memory cell, the second data storage window associated with a second plurality of addressable memory locations of the memory device, each of the second plurality of addressable memory locations having at least one memory cell, wherein the first data storage window and the second data storage window form a continuous memory address space.

At 404, the memory device can receive one or more requests to assign a first window index value to the first data storage window and to assign a second window index value to the second data storage window.

At 406, the memory device can receive one or more memory commands from the host device, wherein the one or more memory commands indicate at least the first window index value and at least one address.

At 408, the memory device can access, based at least on the one or more memory commands indicating the first window index value, a location associated with the at least one address within the first plurality of addressable memory locations.

FIG. 5 illustrates an example process for managing data associated with one or more data storage windows. The example process can be implemented by a host device, such as the host device 100 of FIG. 1.

At 502, the host device can send one or more requests to the memory device to identify the first data storage window and to identify the second data storage window.

At 504, the host device can send one or more requests to the memory device to assign a first window index value to the first data storage window and to assign a second window index value to the second data storage window.

At 506, the host device can send one or more memory commands to the memory device, wherein the one or more memory commands indicate at least the first window index value and at least one address.

At 508, the host device can receive, based at least on the one or more memory commands indicating the first window index value, data stored at a location associated with the at least one address within the first plurality of addressable memory locations.

Although a feature may appear to be described in connection with a particular embodiment, one skilled in the art would recognize that various features of the described embodiments may be combined. Moreover, aspects described in connection with an embodiment may stand alone.

In some instances, a data storage window may be associated with a single physical or logical memory entity. The memory entity may be a memory chip (e.g. NAND die), a memory package (e.g. an eMMC memory module package), or may include several memory dies and/or packages.

In some instances, a memory sub-system or host may form a continuous memory address space from plurality of data storage windows, for example, in case the memory windows are associated with memory entities located in separate physical interfaces or entities.

Example Clauses

Example A, a memory device comprising: a first plurality of addressable memory locations, each of the first plurality of addressable memory locations having at least one memory cell, the first plurality of addressable memory locations collectively associated with a first data storage window; a second plurality of addressable memory locations, each of the second plurality of addressable memory locations having at least one memory cell, the second plurality of addressable memory locations collectively associated with a second data storage window, wherein the first data storage window and the second data storage window form a continuous memory address space; and a memory device controller, coupled to the first plurality of addressable memory locations and to the second plurality of addressable memory locations, the memory device controller operable to: receive one or more requests from a host device to identify the first data storage window and to identify the second data storage window; receive one or more requests to assign a first window index value to the first data storage window and to assign a second window index value to the second data storage window; receive one or more memory commands from the host device, wherein the one or more memory commands indicate at least the first window index value and at least one address; and access, based at least on the one or more memory commands indicating the first window index value, a location associated with the at least one address within the first plurality of addressable memory locations.

Example B, the memory device of Example A, wherein the first window index value is different from the second window index value.

Example C, the memory device of any one of Example A or Example B, wherein the first data storage window is located on physically separate non-volatile memory chip than the second data storage window.

Example D, the memory device of any one of Example A through Example C, wherein the one or more requests to identify the first data storage window and to identify the second data storage window include a command to read a unique identifier from each of the data storage windows.

Example E, the memory device of any one of Example A through Example D, wherein the one or more requests from the host device to assign a window index value to each of the data storage windows includes a command for setting a relative memory device address.

Example F, the memory device of any one of Example A through Example E, wherein the one or more requests to identify each of the data storage windows and the one or more requests to assign a window index value to each of the data storage windows are alternated until all data storage windows are identified and assigned window index values.

Example G, the memory device of any one of Example A through Example F, wherein the memory device controller is further operable to receive one or more commands for specifying a number of data storage windows.

Example H, the memory device of any one of Example A through Example G, wherein the memory device controller is further operable to receive one or more commands for specifying a size of each data storage window.

Example I, the memory device of any one of Example A through Example H, wherein the continuous memory address space includes a continuous logical memory address space.

Example J, the memory device of any one of Example A through Example I, wherein the continuous memory address space includes a continuous physical memory address space.

Example K, the memory device of any one of Example A through Example J, wherein the host device provides the window index value to each of the data storage windows.

Example L, the memory device of any one of Example A through Example K, wherein the memory device controller is further operable to assign the first window index value and the second window index value, respectively, to the first data storage window and the second data storage window.

Example M, the memory device of any one of Example A through Example L, further comprising a third plurality of addressable memory locations, wherein the memory device controller is further operable to: store the first window index value and the second window index value in the third plurality of addressable memory locations.

Example N, the memory device of Example M, wherein the third plurality of addressable memory locations includes at least one or more: registers, descriptors, attributes, or flags.

Example O, the memory device of any one of Example A through Example N, wherein the memory device controller is further operable to: send the first window index value and the second window index value to the host device.

Example P, the memory device of any one of Example A through Example O, wherein at least one of the one or more memory commands from the host device is a memory device select/deselect command that indicates the first window index value and the second window index value.

Example Q, the memory device of any one of Example A through Example P, wherein a first address space associated with the first data storage window and a second address space associated with the second data storage window form a non-overlapping continuous memory address space.

Example R, the memory device of any one of Example A through Example Q, wherein the host device is operable to translate the one or more memory commands from a first 64-bit address argument into a native bit address argument associated with the memory device.

Example S, a method of operating a memory device, the method comprising: receiving one or more requests from a host device to identify a first data storage window and to identify a second data storage window, the first data storage window associated with a first plurality of addressable memory locations of the memory device, each of the first plurality of addressable memory locations having at least one memory cell, the second data storage window associated with a second plurality of addressable memory locations of the memory device, each of the second plurality of addressable memory locations having at least one memory cell, wherein the first data storage window and the second data storage window form a continuous memory address space; receiving one or more requests to assign a first window index value to the first data storage window and to assign a second window index value to the second data storage window; receiving one or more memory commands from the host device, wherein the one or more memory commands indicate at least the first window index value and at least one address; and accessing, based at least on the one or more memory commands indicating the first window index value, a location associated with the at least one address within the first plurality of addressable memory locations.

Example T, the method of Example S, wherein the first window index value is different from the second window index value.

Example U, the method of any one of Example S and Example T, wherein the first data storage window is located on a physically separate non-volatile memory chip than the second data storage window.

Example V, the method of any one of Example S through Example U, wherein the one or more requests to identify the first data storage window and to identify the second data storage window include a command to read a unique identifier from each of the data storage windows.

Example W, the method of any one of Example S through Example V, wherein the one or more requests from the host device to assign a window index value to each of the data storage windows includes a command for setting a relative memory device address.

Example X, the method of any one of Example S through Example W, further comprising alternating the one or more requests to identify each of the data storage windows and the one or more requests to assign a window index value to each of the data storage windows, the alternating occurring until the data storage windows are identified and assigned window index values.

Example Y, the method of any one of Example S through Example X, further comprising receiving one or more commands for specifying a number of data storage windows.

Example Z, the method of any one of Example S through Example Y, further comprising receiving one or more commands for specifying a size of each data storage window.

Example AA, the method of any one of Example S through Example Z, wherein the continuous memory address space includes a continuous logical memory address space.

Example BB, the method of any one of Example S through Example AA, wherein the continuous memory address space includes a continuous physical memory address space.

Example CC, the method of any one of Example S through Example BB, wherein the host device provides the window index value to each of the data storage windows.

Example DD, the method of any one of Example S through Example CC, further comprising assigning the first window index value and the second window index value, respectively, to the first data storage window and the second data storage window.

Example EE, the method of any one of Example S through Example DD, wherein the memory device comprises a third plurality of addressable memory locations, the method further comprising: storing the first window index value and the second window index value in the third plurality of addressable memory locations.

Example FF, the method of Example EE, wherein the third plurality of addressable memory locations includes at least one or more: registers, descriptors, attributes, or flags.

Example GG, the method of any one of Example S through Example FF, further comprising sending the first window index value and the second window index value to the host device.

Example HH, the method of any one of Example S through Example GG, wherein at least one of the one or more memory commands from the host device is a memory device select/deselect command that indicates the first window index value and the second window index value.

Example II, the method of any one of Example S through Example HH, wherein a first address space associated with the first data storage window and a second address space associated with the second data storage window form a non-overlapping continuous memory address space.

Example JJ, the method of any one of Example S through Example II, wherein the host device is operable to translate the one or more memory commands from a first 64-bit address argument into a native bit address argument associated with the memory device.

Example KK, a host device comprising: a memory interface configured to be coupled to a memory device, the memory device comprising: a first plurality of addressable memory locations, each of the first plurality of addressable memory locations having at least one memory cell, the first plurality of addressable memory locations collectively associated with a first data storage window; a second plurality of addressable memory locations, each of the second plurality of addressable memory locations having at least one memory cell, the second plurality of addressable memory locations collectively associated with a second data storage window, wherein the first data storage window and the second data storage window form a continuous memory address space; and a host controller operable to: send one or more requests to the memory device to identify the first data storage window and to identify the second data storage window; send one or more requests to the memory device to assign a first window index value to the first data storage window and to assign a second window index value to the second data storage window; send one or more memory commands to the memory device, wherein the one or more memory commands indicate at least the first window index value and at least one address; and receive, based at least on the one or more memory commands indicating the first window index value, data stored at a location associated with the at least one address within the first plurality of addressable memory locations.

Example LL, the host device of Example KK, wherein the first window index value is different from the second window index value.

Example MM, the host device of any one of Example KK or Example LL, wherein the first data storage window is located on physically separate non-volatile memory chip than the second data storage window.

Example NN, the host device of any one of Example KK through Example MM, wherein the one or more requests to identify the first data storage window and to identify the second data storage window include a command to read a unique identifier from each of the data storage windows.

Example OO, the host device of any one of Example KK through Example NN, wherein the one or more requests to assign a window index value to each of the data storage windows includes a command for setting a relative memory device address.

Example PP, the host device of any one of Example KK through Example OO, wherein the one or more requests to identify each of the data storage windows and the one or more requests to assign a window index value to each of the data storage windows are alternated until all data storage windows are identified and assigned window index values.

Example QQ, the host device of any one of Example KK through Example PP, wherein the host controller is further operable to send one or more commands for specifying a number of data storage windows.

Example RR, the host device of any one of Example KK through Example QQ, wherein the host controller is further operable to send one or more commands for specifying a size of each data storage window.

Example SS, the host device of any one of Example KK through Example RR, wherein the continuous memory address space includes a continuous logical memory address space.

Example TT, the host device of any one of Example KK through Example SS, wherein the continuous memory address space includes a continuous physical memory address space.

Example UU, the host device of any one of Example KK through Example TT, wherein the host controller is further operable to provide the window index value to each of the data storage windows.

Example VV, the host device of any one of Example KK through Example UU, wherein the memory device is operable to assign the first window index value and the second window index value, respectively, to the first data storage window and the second data storage window.

Example WW, the host device of any one of Example KK through Example VV, wherein the memory device further comprises a third plurality of addressable memory locations, wherein the memory device is operable to: store the first window index value and the second window index value in the third plurality of addressable memory locations.

Example XX, the host device of Example WW, wherein the third plurality of addressable memory locations includes at least one or more: registers, descriptors, attributes, or flags.

Example YY, the host device of any one of Example KK through Example XX, wherein the host controller is further operable to: receive the first window index value and the second window index value from the memory device.

Example ZZ, the host device of any one of Example KK through Example YY, wherein at least one of the one or more memory commands includes a memory device select/deselect command that indicates the first window index value and the second window index value.

Example AAA, the host device of any one of Example KK through Example ZZ, wherein a first address space associated with the first data storage window and a second address space associated with the second data storage window form a non-overlapping continuous memory address space.

Example BBB, the host device of any one of Example KK through Example AAA, wherein the host controller is further operable to translate the one or more memory commands from a first 64-bit address argument into a native bit address argument associated with the memory device.

The invention claimed is:

1. A memory device comprising:
a first plurality of addressable memory locations, each of the first plurality of addressable memory locations having at least one memory cell, the first plurality of addressable memory locations collectively associated with a first data storage window;
a second plurality of addressable memory locations, each of the second plurality of addressable memory locations having at least one memory cell, the second plurality of addressable memory locations collectively associated with a second data storage window,
wherein the first data storage window and the second data storage window form a continuous memory address space; and
a memory device controller, coupled to the first plurality of addressable memory locations and to the second plurality of addressable memory locations, the memory device controller operable to:
receive one or more requests from a host device to identify the first data storage window and to identify the second data storage window;

receive one or more requests to assign a first window index value to the first data storage window and to assign a second window index value to the second data storage window;

receive one or more memory commands from the host device, wherein the one or more memory commands indicate at least the first window index value and at least one address; and access, based at least on the one or more memory commands indicating the first window index value, a location associated with the at least one address within the first plurality of addressable memory locations.

2. The memory device of claim 1, further comprising a first non-volatile memory entity physically separate from a second non-volatile memory entity, wherein the first data storage window is associated with the first non-volatile memory entity and the second data storage window is associated with the second non-volatile memory entity.

3. The memory device of claim 1, wherein the one or more requests to identify the first data storage window and to identify the second data storage window include a command to read a unique identifier from each of the data storage windows, wherein the one or more requests from the host device to assign a window index value to each of the data storage windows includes a command for setting a relative memory device address, and wherein the one or more requests to identify each of the data storage windows and the one or more requests to assign a window index value to each of the data storage windows are received in a repeating and alternating sequence until all data storage windows are identified and assigned window index values.

4. The memory device of claim 1, wherein the memory device controller is further operable to:

receive one or more commands for specifying a number of data storage windows; and receive one or more commands for specifying a size of each data storage window.

5. The memory device of claim 1, wherein the continuous memory address space includes at least one of a continuous logical memory address space or a continuous physical memory address space.

6. The memory device of claim 1, wherein the host device provides window index values to respective data storage windows.

7. The memory device of claim 1, wherein the memory device controller is further operable to assign the first window index value and the second window index value, respectively, to the first data storage window and the second data storage window.

8. The memory device of claim 1, further comprising a third plurality of addressable memory locations, wherein the memory device controller is further operable to:

store the first window index value and the second window index value in the third plurality of addressable memory locations, and provide the first window index value and the second window index value to the host device.

9. The memory device of claim 1, wherein at least one of the one or more memory commands from the host device is a memory device select/deselect command that indicates the first window index value and the second window index value.

10. A method of operating a memory device, the method comprising:

receiving one or more requests from a host device to identify a first data storage window and to identify a second data storage window, the first data storage window associated with a first plurality of addressable memory locations of the memory device, each of the first plurality of addressable memory locations having at least one memory cell, the second data storage window associated with a second plurality of addressable memory locations of the memory device, each of the second plurality of addressable memory locations having at least one memory cell, wherein the first data storage window and the second data storage window form a continuous memory address space;

receiving one or more requests to assign a first window index value to the first data storage window and to assign a second window index value to the second data storage window;

receiving one or more memory commands from the host device, wherein the one or more memory commands indicate at least the first window index value and at least one address; and accessing, based at least on the one or more memory commands indicating the first window index value, a location associated with the at least one address within the first plurality of addressable memory locations.

11. The method of claim 10, further comprising:

associating the first data storage window with a first non-volatile memory entity; and associating the second data storage window with a second non-volatile memory entity that is physically separate from the first non-volatile memory entity.

12. The method of claim 10, wherein the one or more requests to identify the first data storage window and to identify the second data storage window include a command to read a unique identifier from respective data storage windows, and wherein the one or more requests from the host device to assign a window index value to each of the data storage windows includes a command for setting a relative memory device address.

13. The method of claim 10, further comprising receiving the one or more requests to identify respective data storage windows and the one or more requests to assign a window index value to the respective data storage windows in an alternating sequence, the alternating sequence repeated until the data storage windows are identified and assigned window index values.

14. The method of claim 10, further comprising:

receiving one or more commands for specifying a number of data storage windows, and receiving one or more commands for specifying a size of each data storage window.

15. The method of claim 10, wherein the continuous memory address space includes at least one of a continuous logical memory address space or a continuous physical memory address space.

16. The method of claim 10, further comprising assigning the first window index value and the second window index value, respectively, to the first data storage window and the second data storage window.

17. A host device comprising:

a memory interface configured to be coupled to a memory device, the memory device comprising:

a first plurality of addressable memory locations, each of the first plurality of addressable memory locations having at least one memory cell, the first plurality of addressable memory locations collectively associated with a first data storage window;

a second plurality of addressable memory locations, each of the second plurality of addressable memory locations having at least one memory cell, the second plurality of addressable memory locations collectively associated with a second data storage window, wherein the first data storage window and the second data storage window form a continuous memory address space; and a host controller operable to:

send one or more requests to the memory device to identify the first data storage window and to identify the second data storage window;

send one or more requests to the memory device to assign a first window index value to the first data storage window and to assign a second window index value to the second data storage window;

send one or more memory commands to the memory device, wherein the one or more memory commands indicate at least the first window index value and at least one address; and receive, based at least on the one or more memory commands indicating the first window index value, data stored at a location associated with the at least one address within the first plurality of addressable memory locations.

18. The host device of claim 17, wherein the one or more requests to identify the first data storage window and to identify the second data storage window include a command to read a unique identifier from each of the data storage windows, wherein the one or more requests to assign a window index value to each of the data storage windows includes a command for setting a relative memory device address, and wherein the one or more requests to identify each of the data storage windows and the one or more requests to assign a window index value to each of the data storage windows are sent in a repeating and alternating sequence until all data storage windows are identified and assigned window index values.

19. The host device of claim 17, wherein the host controller is further operable to:

send one or more commands for specifying a number of data storage windows, and send one or more commands for specifying a size of each data storage window.

20. The host device of claim 17, wherein the host controller is further operable to provide window index values to respective data storage windows.

* * * * *